United States Patent
Katbi et al.

[11] Patent Number: 5,324,144
[45] Date of Patent: Jun. 28, 1994

[54] HIGH SHEER, ULTRA LIGHT DUTY INSERT

[75] Inventors: Karl Katbi, Troy; Tony M. Lowe, Royal Oak, both of Mich.

[73] Assignee: Valenite Inc., Troy, Mich.

[21] Appl. No.: 948,372

[22] Filed: Sep. 21, 1992

[51] Int. Cl.$^5$ .......................... B23B 27/22; B23C 5/20
[52] U.S. Cl. ...................................... 407/114; 407/116
[58] Field of Search ................. 407/113, 114, 115, 116

[56] References Cited

U.S. PATENT DOCUMENTS

| | | | |
|---|---|---|---|
| 4,116,576 | 9/1978 | Gawryk | 407/114 |
| 4,465,412 | 8/1984 | Zweekly | 407/116 |
| 4,626,141 | 12/1986 | Malaker et al. | 407/114 |
| 4,846,609 | 7/1989 | Bernadic et al. | 407/114 |
| 4,893,969 | 1/1990 | Hessman et al. | 407/115 |
| 4,963,061 | 10/1990 | Katbi et al. | 407/116 |
| 5,000,626 | 3/1991 | Bernadic et al. | 407/114 |
| 5,082,401 | 1/1992 | Niebauer | 407/114 |
| 5,122,017 | 6/1992 | Niebauer | 407/114 |
| 5,141,367 | 8/1992 | Beeghly et al. | 407/114 |
| 5,147,159 | 9/1992 | Lowe et al. | 407/116 |

FOREIGN PATENT DOCUMENTS

| | | | |
|---|---|---|---|
| 0166898 | 1/1986 | European Pat. Off. | 407/114 |
| 2845211 | 4/1979 | Fed. Rep. of Germany | 407/114 |
| 3148535 | 7/1983 | Fed. Rep. of Germany | 407/114 |

*Primary Examiner*—William E. Terrell
*Attorney, Agent, or Firm*—Bill C. Panagos

[57] ABSTRACT

A polygonal lay down indexable cutting insert for boring, finish turning and backfacing. The insert has a positive land surface and particularly useful at moderate to high cutting speeds and at low range of feed rates and depths of cut.

7 Claims, 2 Drawing Sheets

HIGH SHEER, ULTRA LIGHT DUTY INSERT

BACKGROUND OF THE INVENTION

The present invention relates to a polygonal, lay down indexable cutting insert to turn ductile material like steel at moderate to high cutting speeds and at low ranges of feed and depth of cut.

The present invention further relates to a high sheer, low force throwaway cutting insert which is a positive insert and is useful for boring, back facing and finish turning operations.

SUMMARY OF THE INVENTION

The present invention is directed to a polygonal, lay down indexable cutting insert which is useful at moderate to high cutting speeds and low range ranges of feed and depth of cut. Indeed, the application feed rate range for the insert of the present invention is from about 0.002 to 0.012 inches per revolution (IPR) and the depth of cut range is from about 0.005 to 0.080 inches. The insert has a cutting edge and a positive land surface. The chip breaker groove is of a concave radius shape, and, at the corners of the insert, the nose projections of the island form a convex radius shaped ascending backwall for chip control. A central aperture is provided and a recessed pad center surrounds the central aperture to allow for better seating within a tool holder pocket, and reduces overall production costs due to grinding and raw material required to form the insert.

DETAILED DESCRIPTION OF THE PREFERRED EMBODIMENT

Figure 1:
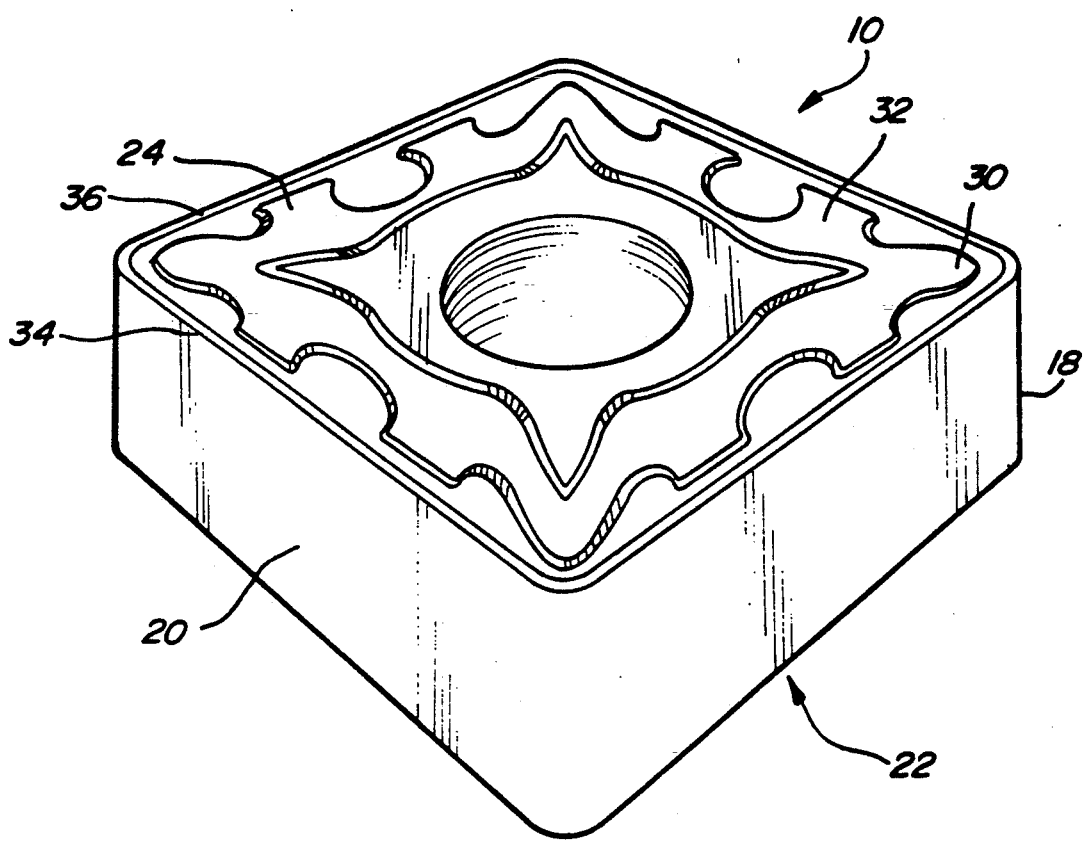
FIG. 1 is a top perspective view of the insert of the present invention.
Figure 2:
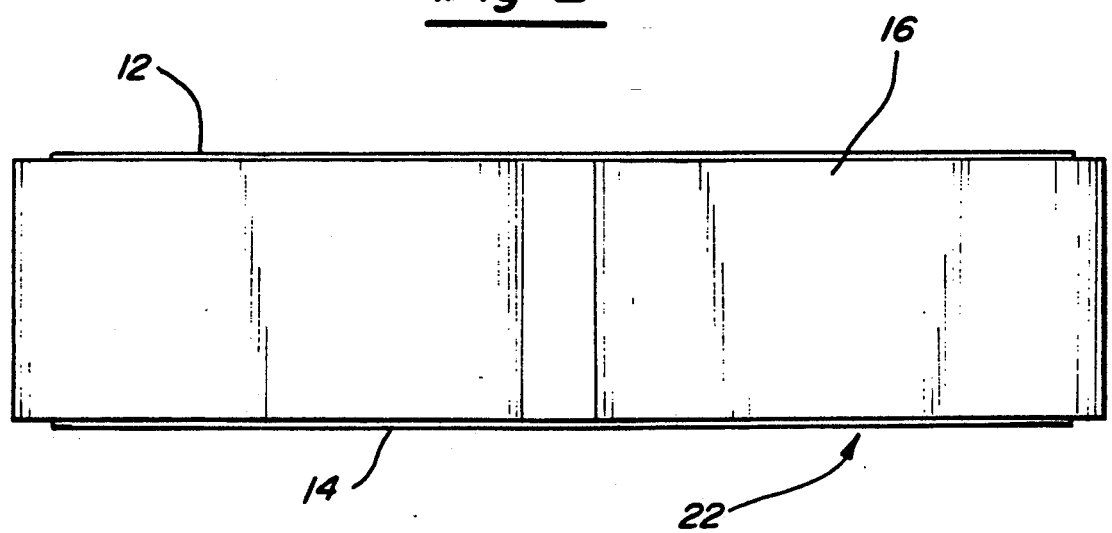
FIG. 2 is a side view of the insert of the present invention.
Figure 3:
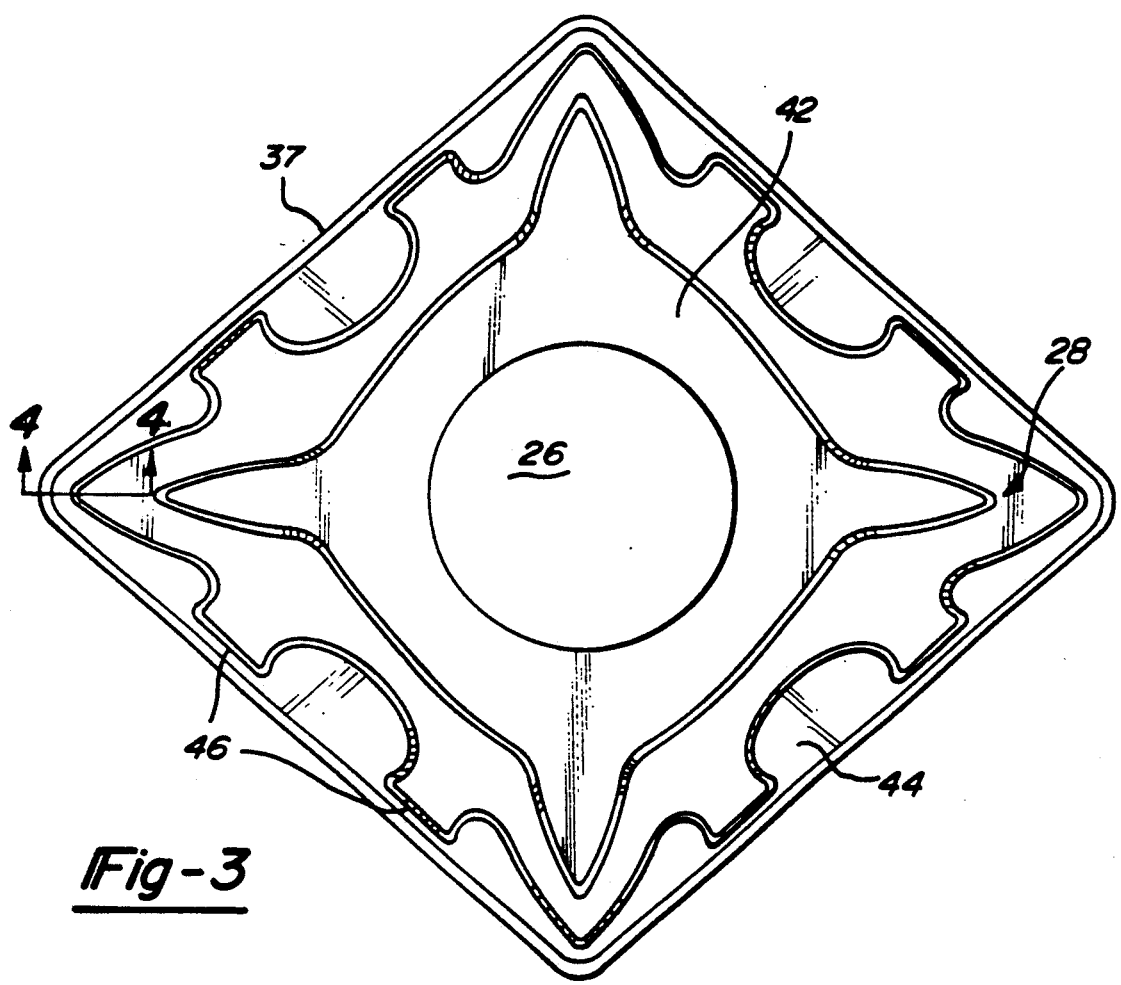
FIG. 3 is a top plan view of the insert of the present invention.

Turning now to the drawings, and particularly to FIGS. 1 through 3, wherein like numerals depict like structures, polygonal, lay down indexable insert 10 is comprised of a top surface 12 and a bottom surface 14 which are substantially identical and parallel to each other, and side wall 16 extending substantially perpendicular thereto and unbroken therebetween to define a body 22. The sidewall is comprised of side flanks 20, which extend from corner to corner of the insert and are substantially planar.

The insert is further equipped with a central aperture 26 extending through the body and an island 24 on the top and bottom surface of the insert. The island has nose projections 28 at corner 18 of the insert. A recessed pad center 42 surrounds the aperture. The nose projections are comprised of a main ridge or extension 30, and side ridges or extension 32 extending equidistant and located opposite to each other. Thus, on each side flank of the insert, there will necessarily be two nose portions comprised of a main ridge and two side ridges, one on either side of the main ridge. Accordingly, it can be seen that where two side ridges approach each other along any flank, there is formed a hook 46 which is useful for backfacing operations. At each hook, there is formed a flat, planar chip breaker bottom 44.

Figure 4:
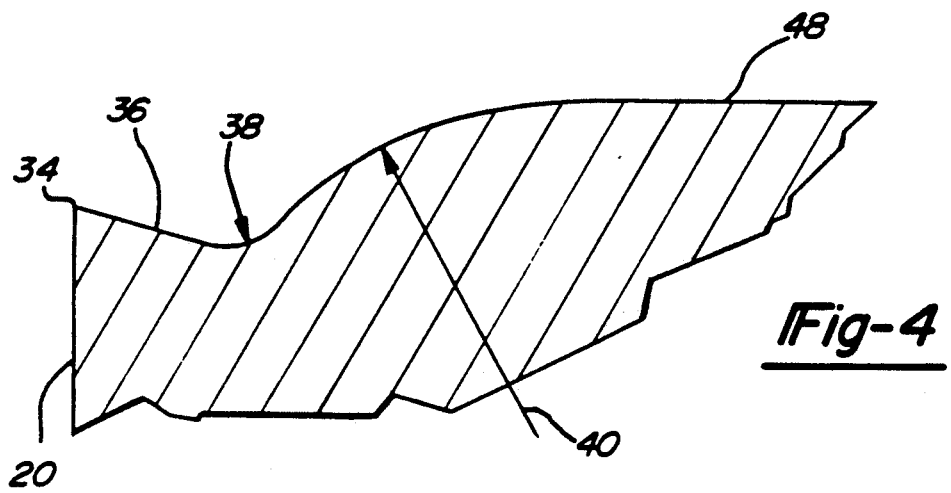
FIG. 4 is a sectional view of the insert of FIG. 3 taken along line 4—4.

Turning now to FIG. 4, there is depicted therein a sectional view taken along line 4—4 of the insert of FIG. 3. Cutting edge 34 is formed by the intersection of the sidewall and the top surface. Rearward of the cutting edge is positive land surface 36. Preferably, the land surface is inclined at about 16 to 18 degrees. The land surface is planar and of uniform width around the entire perimeter 37 of the insert. At each corner, the positive land intersects concave radius shaped chipbreaker groove 38. The groove is preferably of about 0.005 inches radius and descends 0.008 inches from the cutting edge. The groove intersects the main ridge of the nose portion of the island which has a convex radius shape and functions as a convex radius ascending backwall. Thus, it can be seen that a chip would be strained in one direction in the groove and in another direction on the ascending backwall portion of the main ridge, thereby contributing to excellent chip control. The convex radius shape of the ascending backwall preferably has a 0.030 inches radius. It should also be noted that the planar top face 48 of the island is raised above the cutting edge, and preferably is raised 0.012 inches from the chip breaker groove.

The insert of the present invention is useful for boring, finish turning and backfacing operations and provides minimal contact between the cutting edge and a workpiece. The configuration of the island aids is profiling and backfacing operations. The insert is particularly useful with a feed rate of about 0.002 to 0.012 IPR and at depths of cut of 0.005 to 0.080 inches.

Those skilled in the art recognize that many variations are possible without departing from the scope and spirit of the invention.

We claim:

1. A polygonal, lay down indexable cutting insert for low range of feed and depth of cut, comprising:

a top surface and a bottom surface substantially parallel and identical to each other with a side wall substantially perpendicular thereto and extending substantially unbroken therebetween to define a body, said sidewall comprised of planar side flanks extending from corner to corner of the insert, a cutting edge formed by the intersection of the sidewall and the top surface, said cutting edge extending along the periphery of the insert, an island formed on said top and bottom surface of the insert, said island having a planar top face which is raised above the cutting edge of the insert, said island having a nose projection at each corner of the insert, said nose projections each comprised of a main extension of said top face projecting toward the respective corner and two side extensions on either side of the main extension projecting toward respective side flanks, said side extensions extending equidistant and opposite to each other, a planar, descending positive land surface contiguous with and extending rearward from the cutting edge, a concave radius shaped chip breaker groove contiguous with said land surface extending parallel to the cutting edge merging with an ascending convex radius shaped backwall forming the forward margin of the main extension of the nose portion of the island at the corners of the insert, and a planar chip breaker bottom surface adjacent said land surface along the flanks of the insert.

2. The insert of claim 1, wherein said positive land surface is inclined from about 16 to 18 degrees.

3. The insert of claim 1, wherein said convex radius ascending backwall has a radius of about 0.030 inches.

4. The insert of claim 1, wherein said concave radius groove has a radius of about 0.005 inches.

5. The insert of claim 1, wherein said groove descends about 0.008 inches from said cutting edge.

6. The insert of claim 1, wherein said island top face is raised about 0.012 inches from said chip breaker groove.

7. The insert of claim 1, wherein said depth of cut is about 0.005 to 0.080 inches, and said feed rate is about 0.002 to 0.012 IPR.

* * * * *